(12) United States Patent
Hsu et al.

(10) Patent No.: US 6,256,117 B1
(45) Date of Patent: Jul. 3, 2001

(54) DISTINGUISHING METHOD FOR OBJECT SCANNED BY SCANNING DEVICE

(75) Inventors: Adolf T. R. Hsu, Yunlin Hsien; Ching-Chih Fan, Hsinchu, both of (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/116,186

(22) Filed: Jul. 15, 1998

(51) Int. Cl.⁷ ....................................................... H04N 1/04
(52) U.S. Cl. ............................ 358/475; 358/474; 358/487
(58) Field of Search ................................... 358/474, 486, 358/488, 498, 487, 505, 509, 475; 340/347; 350/96

(56) References Cited

U.S. PATENT DOCUMENTS

| | | | |
|---|---|---|---|
| 4,588,982 | * 5/1986 | Goodwin et al. | 340/347 |
| 4,891,711 | * 1/1990 | Tomita | 358/448 |
| 4,926,267 | * 5/1990 | Shu et al. | 358/454 |
| 4,953,933 | * 9/1990 | Asmar | 350/96 |
| 5,140,443 | * 8/1992 | Iwahara | 358/474 |
| 5,392,100 | * 2/1995 | Yoshida | 358/497 |
| 5,455,873 | * 10/1995 | Cameron | 382/270 |
| 5,574,274 | * 11/1996 | Rubley | 250/208.1 |
| 5,673,125 | * 9/1997 | Merecki | 358/487 |
| 5,705,805 | * 1/1998 | Han | 358/474 |
| 6,005,990 | * 12/1999 | Barrett | 382/323 |

* cited by examiner

*Primary Examiner*—Cheukfan Lee
(74) *Attorney, Agent, or Firm*—Skjerven Morrill MacPherson LLP

(57) ABSTRACT

A method is provided for distinguishing an object to one of a transmissive object and a reflective object used in a transmissive/reflective scanning device. The scanning device includes a transmitting light source and a reflecting light source. The method includes steps of (a) lighting up one of the transmitting light source and the reflecting light source, (b) scanning a portion of the object by using the lighted light source to obtain an image signal, (c) calculating a scanning value of the image signal, and (d) distinguishing the object to be one of the transmissive object and the reflective object according to the scanning value of the image signal.

21 Claims, 2 Drawing Sheets

DISTINGUISHING METHOD FOR OBJECT SCANNED BY SCANNING DEVICE

FIELD OF THE INVENTION

The present invention is related to a distinguishing method for an object, and more particularly to a distinguishing method for an object scanned by a transmissive/reflective scanning device.

BACKGROUND OF THE INVENTION

At the present time, the scanners are so popular that they are required to have more and more functions. The flatbed scanner used today has both transmissive mode and reflective mode, and so does the sheetfed scanner. If a reflective object such as a piece of paper needs to be scanned, the reflective mode must be in use. The light source (hereafter called "reflecting light source") mounted at the same side of the charge coupled device with respect to the reflective object is turned on to scan the reflective object. A reflected image signal is sensed by the photo sensor on the charge coupled device to form the digital data. If a transmissive object such as a transparency needs to be scanned, the transmissive mode must be in use. The light source (hereafter called "transmitting light source") mounted at the opposite side of the charge coupled device with respect to the transmissive object is turned on to scan the transmissive object. A transmitted image signal is sensed by the charge coupled device to form the digital data. However, the problem is that the users must know the type of the scanned object and switch among the reflective mode and the transmissive mode of the scanner by themselves. The users are often puzzled by such manual operation when a great number of non-arranged documents including both types of the scanned objects need to be scanned. Obviously, it is not convenient for the users to switch the scanning mode of the scanner.

SUMMARY OF THE INVENTION

An objective of the present invention is to provide an method for a scanner to automatically distinguish the object.

In accordance with the present invention, a method is provided for distinguishing a scanned object between a transmissive object and a reflective object used in a transmissive/reflective scanning device having a transmitting light source and a reflecting light source. The method includes steps of (a) lighting up one of the transmitting light source and the reflecting light source, (b) scanning a portion of the scanned object by using the lighted light source to obtain an image signal, (c) calculating a scanning value of the image signal, and (d) distinguishing the scanned object to be one of the transmissive object and the reflective object according to the scanning value of the image signal.

In accordance with another aspect of the present invention, before the step (b), the method includes a step of (b1) feeding the portion of the scanned object into the scanning device.

In accordance with another aspect of the present invention, the portion of the scanned object preferably has a shape of a rectangle.

In accordance with another aspect of the present invention, the scanning value is an average gray scale.

In accordance with another aspect of the present invention, in order to get the average gray scale, the step (c) includes steps of (c1) summing up gray scale values of the total number of pixels of the image signal, and (c2) getting the average gray scale by dividing the summed gray scale values by the total number of pixels of the image signal.

In accordance with another aspect of the present invention, the lighted light source may be the transmitting light source. Thus, the scanned object is distinguished to be the transmissive object if the average gray scale is greater than a specific value. On the contrary, the scanned object is distinguished to be the reflective object if the average gray scale is less than the specific value.

In accordance with another aspect of the present invention, the lighted light source may be the reflecting light source. Thus, the scanned object is distinguished to be the reflective object if the average gray scale is greater than a specific value. On the contrary, the scanned object is distinguished to be the transmissive object if the average gray scale is less than the specific value.

In accordance with the present invention, a method is provided for distinguishing a transmissive object and a reflective object used in a transmissive/reflective sheetfed scanning device having a transmitting light source and a reflecting light source. The method includes steps of (a) lighting up one of the transmitting light source and the reflecting light source, (b) feeding a portion of said scanned object having a specific length into the scanning device, (c) scanning the portion of the scanned object with the specific length by using the lighted light source to obtain an image signal, (d) calculating a scanning value of the image signal, and (e) distinguishing the scanned object to be one of the transmissive object and the reflective object according to the scanning value of the image signal.

In accordance with another aspect of the present invention, the step (c) further includes a step of (c1) detecting a width of the scanned object. Thus, the scanned object has a shape of a rectangle having the specific length and the width.

In accordance with another aspect of the present invention, the scanning value is an average gray scale.

In accordance with another aspect of the present invention, in order to get the average gray scale, the step (d) includes steps of (d1) summing up gray scale values of all pixels of the image signal, and (d2) getting the average gray scale by dividing the summed gray scale values by the total number of pixels of the image signal.

In accordance with another aspect of the present invention, the step (e) includes a step of (e1) distinguish the scanned object to be one of the transmissive object and the reflective object by comparing the average gray scale and a specific value.

The present invention may best be understood through the folloiling description with reference to the accompanying drawings, in which:

DETAILED DESCRIPTION OF THE PREFERRED EMBODIMENTS

The present invention will be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1:
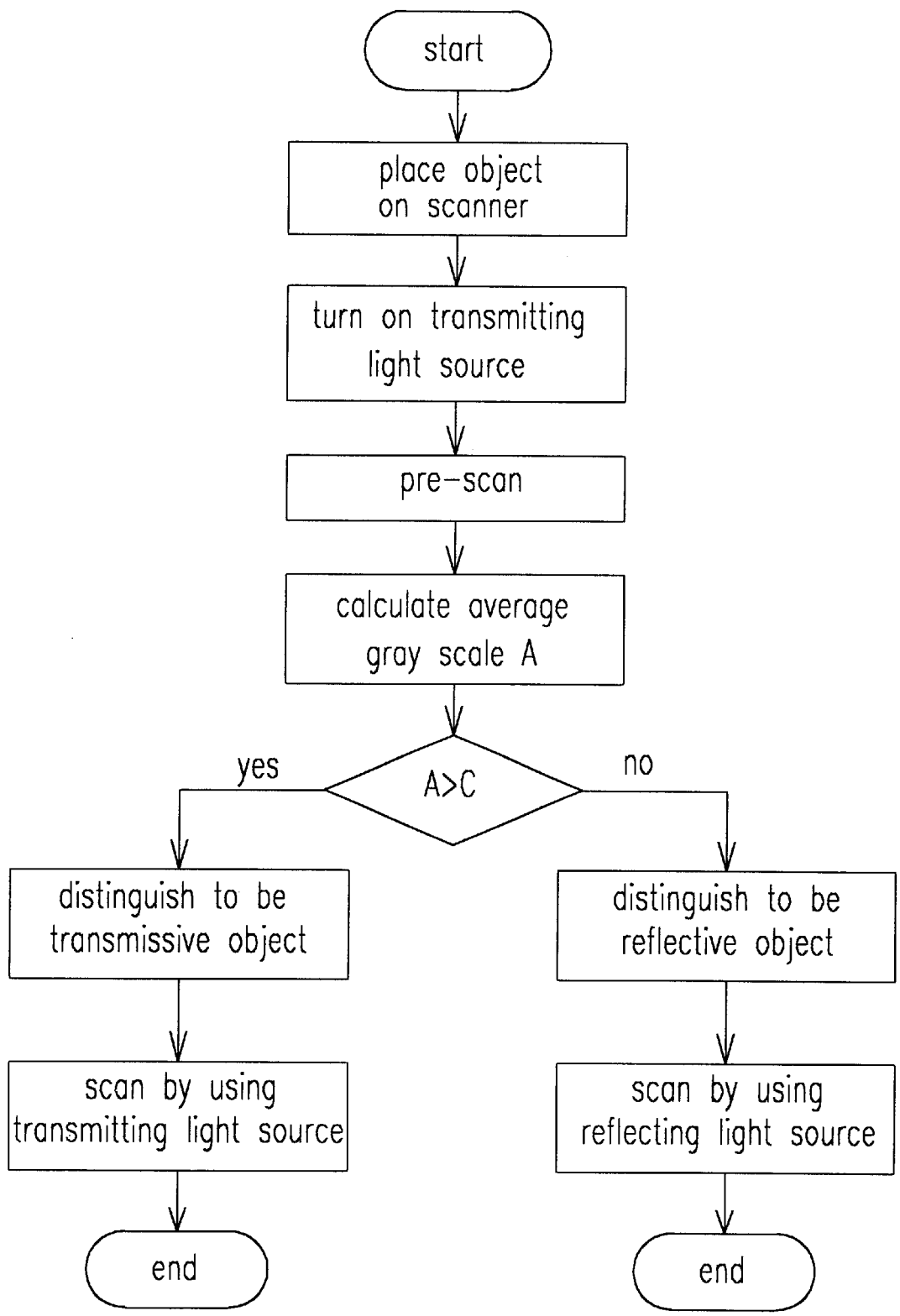
FIG. 1 is a flow chart showing a preferred embodiment of a scanning method according to the present invention.

Please refer to FIG. 1 which is a flow chart showing a preferred embodiment of a distinguishing method according to the present invention. This method is used for a flatbed scanner. The steps are described in detail as follows.

step(1): The object is placed on the scanning window to be scanned in order to generate a full image data. The object is preferably a rectangular object so the width of the scanned object is constant.

step(2): The transmitting light source is turned on when a scanning instruction is given by the user.

step(3): The transmitting light source is moved to pre-scan a portion of the object. The length of the pre-scanned portion of the scanned object can be a predetermined value stored in the memory or a value determined by the user. The width of the pre-scanned portion of the object is the width of the object. It is automatically detected by the scanner. After such pre-scanning operation, many gray scale values of pixels corresponding to the portion of the object are obtained to form image data. The "gray scale" is a reference scale for use in black-and-white image. It consists of several defined levels of brightness with neutral color. The most used standard is that "0" indicates the darkest level and "255" indicates the brightest level.

step(4): The average gray scale A is obtained by dividing the summation of gray scale values by the total number of pixels of the image data. Since the length and the width of the pre-scanned portion of the object are known, the number of pixels of the image data can be determined by the length and width accompanied with the scanning resolution.

step(5): The program attached to the scanner compares the average gray scale A with a critical value C. If the average gray scale A is greater than the critical value C, the object is distinguished to be the transmissive object. If the average gray scale A is less than the critical value C, the object is distinguished to be the reflective object. The type of the object is determined herebefore. The critical value C can be a predetermined value or a value inputted by the user.

step(6): Since the type of the object is determined, the scanner can switch its scanning mode corresponding to the type of the object. If the object is a transmissive object, the transmitting light source is turned on again to scan the transmissive object, but not the reflecting light source. The scanning procedure has alternative options. One option is to move the transmitting light source backward to the start position and scan the whole transmissive object to get a full image data. The other option is to scan the other portion of the transmissive object to get the other image data without scanning the pre-scanned portion of the transmissive object described in step (3) again. These two image data will be combined together to form the full image data. The later option seems more efficient. If the object is a reflective object, the reflecting light source is turned on to scan the reflective object, but not the transmitting light source. Obviously, the whole reflective object must be scanned because the transmitted image data obtained in step (3) makes no contribution to the reflective image data.

Certainly, the lighted light source for distinguishing the type of the object may be replaced by the reflecting light source. The scanning procedure is similar to that illuminated above and is described in brief as follows.

step(1): Place the object on the scanning window.

step(2): Turn on the reflecting light source.

step(3): Pre-scan a portion of the object by using the reflecting light source for obtaining an image data.

step(4): Calculate the average gray scale by dividing the summation of gray scale values by the total number of pixels of the image data.

step(5): Compare the average gray scale with a critical value. If the average gray scale is greater than the critical value, the object is distinguished to be the reflective object. If the average gray scale is less than the critical value, the object is distinguished to be the transmissive object.

step(6): Turn on the reflecting light source to scan the object for generating a full image data if it is a reflective object. To scan all or the other portion of the reflected object are alternative options. On the contrary, turn on the transmitting light source to scan the scanned object for generating the full image data if it is a transmissive object.

Figure 2:
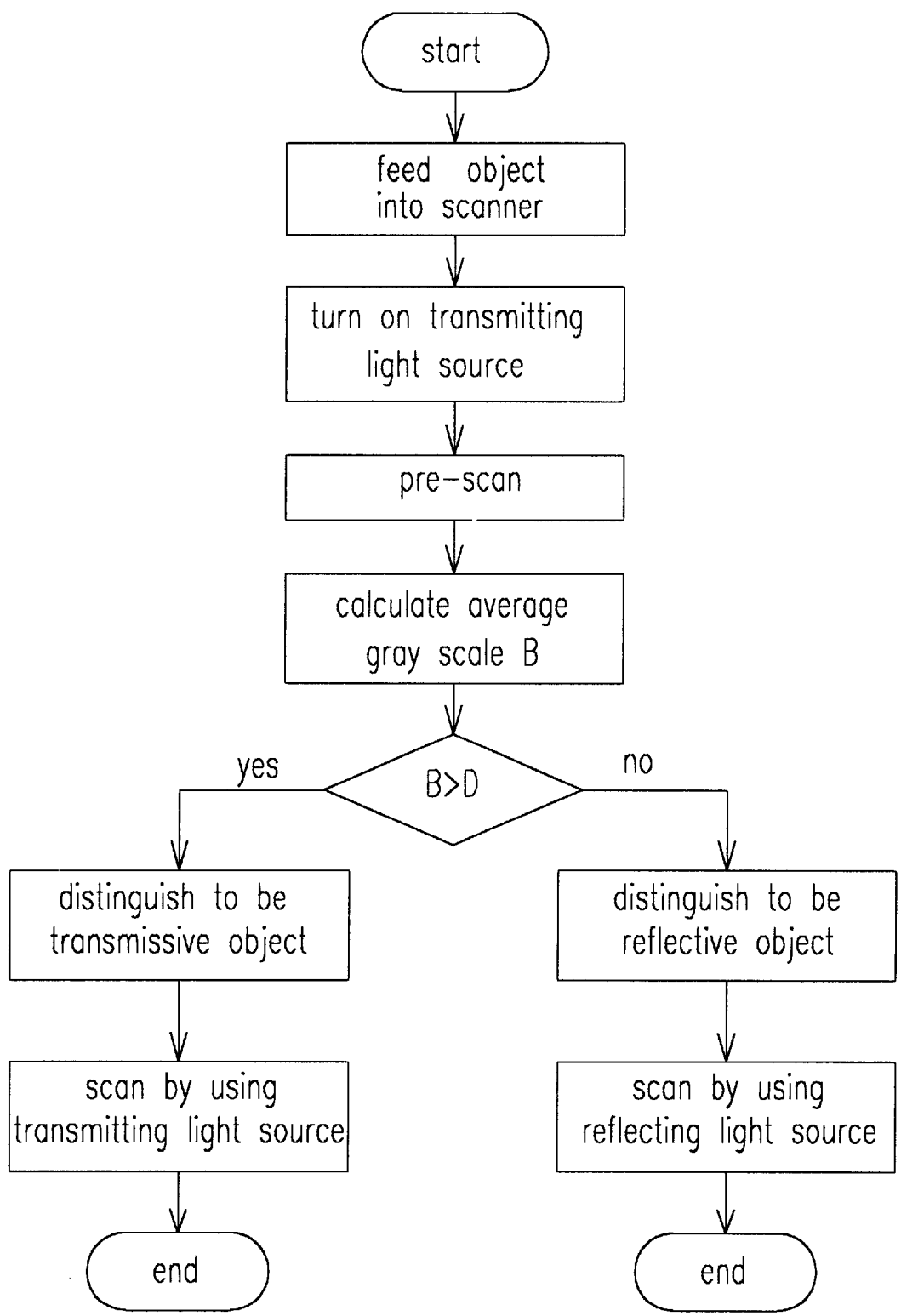
FIG. 2 is a flow chart showing another preferred embodiment of a scanning method according to the present invention.

The present invention can be applied for the sheetfed scanner. Please refer to FIG. 2 which is a flow chart showing another preferred embodiment of a distinguishing method according to the present invention. This method is used for a sheetfed scanner. The steps are described in detail as follows:

step(1): Feeding the object into the scanner for scanning the object to generate a full image data. The object is preferably a rectangular object which has a constant width.

step(2): The transmitting light source is turned on when the object is fed or a scanning instruction is given by the user.

step(3): The scanned object keeps fed into the scanner until the fed portion of the object has a specific length. The specific length can be a predetermined value stored in the memory or a value determined by the user. During the feeding process, the object is pre-scanned by using the transmitting light source synchronously. The width of the pre-scanned portion of the object is the width of the object. It is automatically detected by the scanner. After the pre-scanning operation, many gray scale values of all pixels corresponding to the pre-scanned portion of the scanned object are obtained to form an image data.

step(4): The average gray scale B is obtained by dividing the summation of gray scale values by the number of pixels of the image data. The summation and division can be executed by a software program used for controlling the scanner or by a simple circuit mounted in the scanner. Since the length and the width of the fed portion of the object are known, the number of pixels of the image data can be determined by the length and width accompanied with the scanning resolution.

step(5): Compares the average gray scale B with a critical value D. For relatively high scanning quality, a more transmissive object should be scanned by a transmission mode of the scanner, and a less transmissive object should be scanned by a reflection mode of the scanner. A predetermined or inputted critical value D may be adopted for the judging standard. If the average gray scale B is greater than the critical value D, the scanned object is distinguished to the transmissive object. If the average gray scale B is less than the critical value D, the scanned object is distinguished to the reflective object. The type of the object is determined herebefore.

step(6): Since the type of the object is determined, the scanning mode can be selected corresponding to the type of the object. If the object is a transmissive object, the transmitting light source is turned on again to scan the transmissive object, but not the reflecting light source. The transmissive object is withdrawn backward to the start position. Then, the whole transmissive object is fed into the scanner again. During the feeding process, the transmissive object is scanned to get a full image data. Certainly, the withdrawing operation is not necessary. The other portion of the transmissive object is continuously fed into the scanner to be scanned for generating the other image data. The image data obtained in this step and in step (3) are combined to form a full image data. If the object is distinguished to a reflective object, the reflecting light source is turned on to scan the reflective object, but not the transmitting light source. It is apparent that the whole reflective object must be scanned to get the full image data because the image data obtained by using the transmitting light source in step (3) is useless.

There is no doubt that the light source used for distinguishing the type of the scanned body may be substituted by the reflecting light source. The scanning steps are similar to those described in the preceding preferred embodiment.

step(1): Feed the object into the scanner to be scanned.

step(2): Turn on the reflecting light source while step(1) is detected.

step(3): Pre-scan the fed portion of the object by using the reflecting light source for generating an image data.

step(4): Calculate the average gray scale by dividing the summation of gray scale values by the number of pixels of the image data.

step(5): Compare the average gray scale with a critical value. If the average gray scale is greater than the critical value, the object is distinguished to the reflective object. Otherwise, if the average gray scale is less than the critical value, the scanned object is distinguished to the transmissive object.

step(6): Turn on the reflecting light source again to scan the object if it is a reflective object. The reflective object can be withdrawn backward so that the whole object is scanned. Another optional step is that the pre-scanned portion of the reflective object is not scanned again. On the contrary, the object is withdrawn back and the transmitting light source is turned on to scan the entire scanned object if it is a transmissive object.

In conclusion, the present invention provides an automatically distinguishing method for judging the type of the object. Hence, it is more convenient for the users to scan mixed kinds of objects because they need not switch the scanning mode one by one.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for distinguishing an object to be scanned by a transmissive/reflective dual-mode image scanner as a transmissive object or a reflective object, said transmissive/reflective dual-mode image scanner having a transmitting light source and a reflecting light source, and said method comprising:

(a) lighting up either one of said transmitting light source and said reflecting light source as a pre-scan light source;

(b) pre-scanning a portion of said object by using said pre-scan light source to obtain a pre-scan image signal;

(c) calculating a scanning value of said pre-scan image signal; and (d) distinguishing said object to be said transmissive object or said reflective object according to said scanning value of said pre-scan image signals as to determine which one of said transmitting light source and said reflecting light source will be used for a subsequent scanning operation.

2. A method according to claim 1 wherein before said step (b), said method comprises a step of (b1) feeding said portion of said object into said image scanner.

3. A method according to claim 1 wherein said object has a shape of a rectangle.

4. A method according to claim 1 wherein in said step (c), said scanning value is an average gray scale value.

5. A method according to claim 4 wherein said step (c) comprises steps of:

(c1) summing up gray scale values of all pixels of said pre-scan image signal; and (c2) dividing said summed gray scale values by a total number of said pixels of said pre-scan image to get said average gray scale value.

6. A method according to claim 5 wherein said pre-scan light source is said transmitting light source.

7. A method according to claim 6 wherein said object is distinguished to be said transmissive object when said average gray scale value is greater than a specific value.

8. A method according to claim 6 wherein said object is distinguished to be said reflective object when said average gray scale value is less than a specific value.

9. A method according to claim 5 wherein said pre-scan light source is said reflecting light source.

10. A method according to claim 9 wherein said object is distinguished to be said reflective object when said average gray scale value is greater than a specific value.

11. A method according to claim 9 wherein said object is distinguished to be said transmissive object when said average gray scale value is less than a specific value.

12. A method for distinguishing an object to be scanned by a transmissive/reflective dual-mode image scanner as a transmissive object or a reflective object, said transmissive/reflective dual-mode image scanner having a transmitting light source and a reflecting light source, and said method comprising:

(a) feeding a portion of said object with a specific length into said image scanner, (b) lighting up either one of said transmitting light source and said reflecting light source as a pre-scan light source;

(c) pre-scanning said portion of said object with said specific length by using said pre-scan light source to obtain a pre-scan image signal;

(d) calculating a scanning value of said pre-scan image signal; and (e) distinguishing said object to be said transmissive object or said reflective object according to said scanning value of said pre-scan image signal so as to determine which one of said transmitting light source and said reflecting light source will be used for a subsequent scanning operation.

13. A method according to claim 12 wherein before said step (c), said method further comprises a step of (c1) detecting a width of said object.

14. A method according to claim 13 wherein said portion of said object has a shape of a rectangle with said specific length and said width.

15. A method according to claim 12 wherein in said step (d), said scanning value is an average gray scale value.

16. A method according to claim 15 wherein in said step (d) comprises steps of:
   (d1) summing up gray scale values pixels of said pre-scan image signal; and
   (d2) dividing said summed gray scale values by a total number of said pixels of said pre-scan image signal to get said average gray scale value.

17. A method according to claim 15 wherein said step (e) comprises a step of (e1) comparing said average gray scale value and a specific value to distinguish said object to be said transmissive object or said reflective object.

18. A method for distinguishing an object to be scanned by a transmissive/reflective dual-mode image scanner as a transmissive object or a reflective object so as to optionally perform a transmissive or reflecting scanning operation, said image scanner including a transmitting light source and a reflecting light source for said transmissive and said reflective scanning operations, respectively, and said method comprising:
   lighting up a selected one of said transmitting light source and said reflecting light source;
   using said selected light source as a working light source of said image scanner to scan said object to obtain at least two gray scale values;
   mathematically processing said at least two gray scale values to obtain an index gray scale value; and
   determining said object to be said transmissive object or said reflective object by comparing said index gray scale value with a specific value.

19. A method according to claim 18 wherein each of said gray scale values is ranged between 0 and 255 which represent the darkest level and the brightest level, respectively.

20. A method according to claim 19 wherein said index gray scale value is an average of all obtained gray scale values.

21. A method according to claim 20 wherein said selected light source continues to serve as said working light source of said image scanner for the following scanning operation of said object if said index gray scale value is greater than said specific value.

* * * * *